United States Patent

Zhang et al.

[11] Patent Number: 6,014,452
[45] Date of Patent: Jan. 11, 2000

[54] METHOD AND SYSTEM FOR USING LOCAL ATTENTION IN THE DETECTION OF ABNORMALITIES IN DIGITIZED MEDICAL IMAGES

[75] Inventors: Wei Zhang, Mountain View; Harlan M. Romsdahl, Half Moon Bay; Jimmy R. Roehrig, Palo Alto, all of Calif.

[73] Assignee: R2 Technology, Inc., Los Altos, Calif.

[21] Appl. No.: 08/901,541

[22] Filed: Jul. 28, 1997

[51] Int. Cl.[7] .............................. G06K 9/00; G06K 9/62; A61B 6/04
[52] U.S. Cl. ...................... 382/132; 382/156; 382/225; 378/37
[58] Field of Search .................................. 382/130, 131, 382/132, 156, 225; 378/37

[56] References Cited

U.S. PATENT DOCUMENTS

| | | | |
|---|---|---|---|
| 4,907,156 | 3/1990 | Doi et al. ................................. | 382/130 |
| 5,133,020 | 7/1992 | Giger et al. ............................. | 382/128 |
| 5,263,107 | 11/1993 | Ueda et al. ............................. | 382/157 |
| 5,319,549 | 6/1994 | Katsuragawa et al. ................. | 382/108 |
| 5,331,550 | 7/1994 | Stafford et al. ......................... | 382/128 |
| 5,491,627 | 2/1996 | Zhang et al. ............................ | 600/408 |
| 5,572,565 | 11/1996 | Abdel-Mottaleb ....................... | 378/37 |
| 5,627,907 | 5/1997 | Gur et al. ................................. | 382/132 |
| 5,657,362 | 8/1997 | Giger et al. ............................. | 378/37 |
| 5,732,121 | 3/1998 | Takeo et al. ............................. | 378/62 |
| 5,815,591 | 9/1998 | Roehrig et al. ......................... | 382/130 |

*Primary Examiner*—Jon Chang
*Assistant Examiner*—Mehrdad Dastouri
*Attorney, Agent, or Firm*—Pennie & Edmonds LLP

[57] ABSTRACT

A method an system for using a local attention threshold to aid in the detection of clustered abnormalities in digitized medical images is disclosed. The local attention threshold is applied to locate spots within a predetermined distance from previously identified spots. More specifically, seed pixels are identified by applying a first seed threshold function to the output of a shift-invariant neural network and adaptive threshold. The seed pixels are then segmented into spots by applying a segmentation threshold function to each seed pixel. False-positive spots are removed using various techniques. Additional seed pixels are then identified by applying a local attention threshold to pixels within a predetermined distance to previously identified spots. The local attention threshold disclosed is less selective for pixels which are closer to the nearest spot than for pixels which are further from the nearest spot. The new seed pixels are then segmented into spots, and potential abnormalities are identified in the medical image based in part on the closeness of the identified spots.

25 Claims, 5 Drawing Sheets

METHOD AND SYSTEM FOR USING LOCAL ATTENTION IN THE DETECTION OF ABNORMALITIES IN DIGITIZED MEDICAL IMAGES

BACKGROUND OF THE INVENTION

1. Field of the Invention

The present invention relates to the field of computer aided diagnosis of abnormalities in medical images. In particular, the invention relates to a method and system for using local attention in the detection of clustered microcalcifications in digital mammograms to assist in the detection of malignant breast cancer tumors at an early stage.

2. Description of the Related Art:

Breast cancer in women is a serious health problem, the American Cancer Society currently estimating that over 180,000 women in the United States are diagnosed with breast cancer each year. Breast cancer is the second major cause of cancer death among women; the American Cancer Society also estimates that breast cancer causes the death of over 44,000 women in the United States each year. While at present there is no means for preventing breast cancer, early detection of the disease prolongs life expectancy and decreases the likelihood of the need for a total mastectomy. Mammography using x-rays is currently the most common method of detecting and analyzing breast lesions.

The detection of clustered microcalcifications in mammograms is of particular importance because tumors having such microcalcifications have a relatively high probability of being malignant. While it is important to detect clustered microcalcifications as early as possible, practical considerations can make this difficult. In particular, the microcalcifications may be subtle and faint, and a typical radiologist may be required to examine hundreds of mammograms per day, leading to the possibility of a missed diagnosis due to human error.

Accordingly, the need has arisen for a computer-assisted diagnosis/detection (CAD) system for assisting in the detection of abnormal lesions, including clustered microcalcifications, in medical images. The desired CAD system digitizes x-ray mammograms to produce a digital mammogram, and performs numerical image processing algorithms on the digital mammogram. The output of the CAD system is a highlighted display which directs the attention of the radiologist to suspicious portions of the x-ray mammogram.

The desired characteristics of a clustered microcalcification-detecting CAD system are high speed (requiring less processing time), high precision and high accuracy (the ability to detect subtle microcalcifications and avoid false positives).

One system which uses a Shift Invariant Neural Network for the detection of clustered microcalcifications is described in U.S. Pat. No. 5,491,627 to Zhang et al. entitled "METHOD AND SYSTEM FOR THE DETECTION OF MICROCALCIFICATIONS IN DIGITAL MAMMOGRAMS". However, one drawback of such systems is that they are not able to detect or often miss very subtle clusters of microcalcifications.

SUMMARY OF THE INVENTION

Thus, it is an object of the present invention to provide a method and system for more consistently detecting subtle clustered microcalcifications which are often missed by conventional CAD techniques.

In order to obtain this object and meet other needs, some of which are set forth above, the present invention is directed to a method and system for detecting clustered abnormalities in digitized medical images, by using a local attention threshold to locate spots within a predetermined distance from previously identified spots.

More specifically, according to the invention, a system and method are provided which receives digital image data in the form of gray-scale pixels which represent a medical image, preferably a digitized or digital mammogram. The gray-scale value of each pixel is typically based on the brightness of the corresponding location in the original medical image. An output value is obtained for each pixel, based in-part on the contrast of each pixel relative to nearby pixels, by inputting the gray-scale values for the pixels into a feed-forward shift-invariant neural network.

A fixed threshold is then applied to the output values of the pixels to select a set of candidate pixels, which are then passed through a seed threshold function to identify a set of seed pixels. The seed pixels are then segmented into spots by applying a segmentation threshold function to pixels in close proximity to at least one of the seed pixels. Features of the spots are then analyzed to remove from consideration spots which are not likely to indicate malignant tumors.

According to the invention, additional seed pixels are identified by applying a local attention threshold function to the candidate pixels within a predetermined distance to a previously identified spot. The local attention threshold is less selective for pixels which are closer to the nearest spot and more selective for pixels which are further from the nearest spot.

The seed pixels identified by the local attention threshold are then segmented into spots by applying the segmentation threshold function to the output values of pixels in close proximity to each seed pixel. Potential abnormalities are identified in the medical image by considering at least the distance between the spots.

Figure 1:
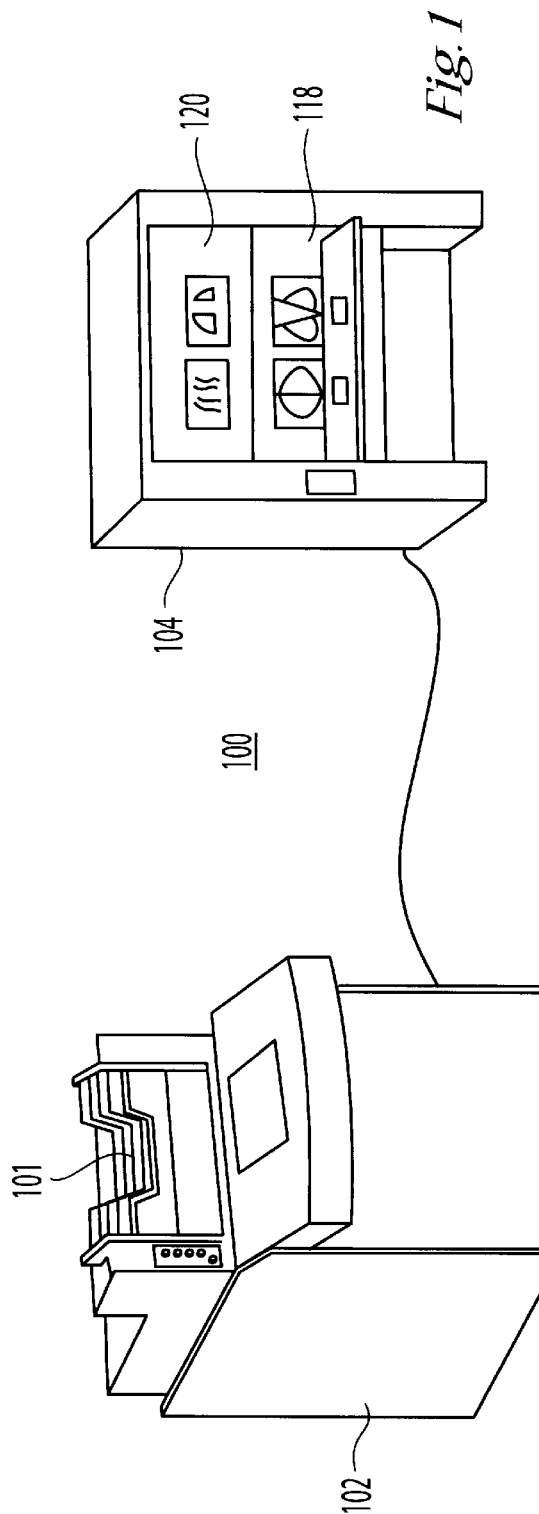
FIG. 1 shows an outside view of a computer aided diagnostic (CAD) system according to the preferred embodiment of the invention.

DETAILED DESCRIPTION OF THE INVENTION:

FIG. 1 shows an outside view of a computer aided diagnostic/detection (CAD) system 100 for assisting in the detection of clustered microcalcifications in mammograms according to the invention. CAD system 100 is used as a step in the processing of films for mammography exams. CAD system 100 comprises a CAD processing unit 102 and a viewing station 104. In general, CAD processing unit 102 converts an x-ray mammogram into a digital mammogram image, processes the image, and outputs a highlighted digital mammogram for viewing at viewing station 104.

Figure 2:
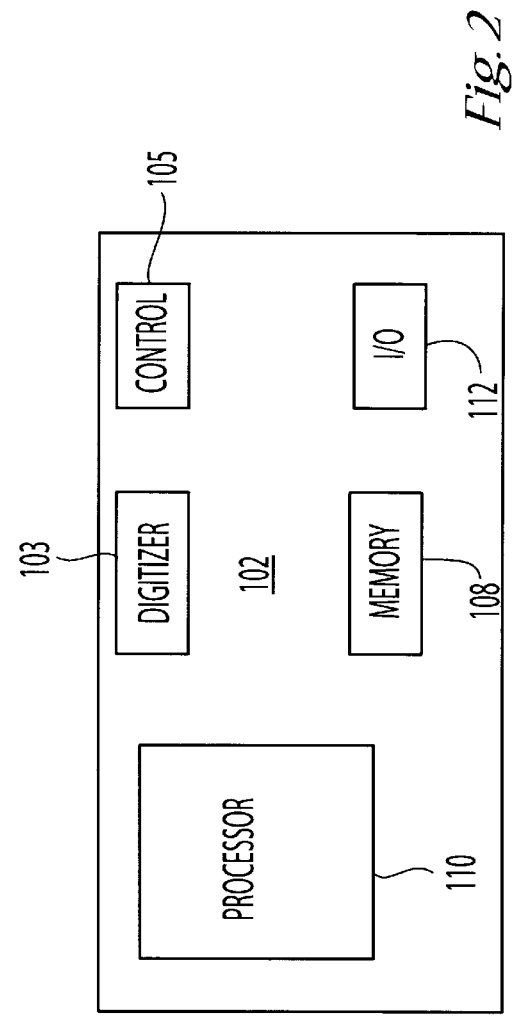
FIG. 2 shows a block diagram of a CAD processing unit of a CAD system according to the preferred embodiment of the invention.

FIG. 2 shows a block diagram of CAD processing unit 102. CAD processing unit 102 comprises a digitizer 103, such as a laser scanner with 50 micron resolution, for digitizing a developed x-ray mammogram 101, the x-ray mammogram 101 being shown in FIG. 1 at an input to the CAD processing unit 102. CAD processing unit 102 generally includes elements necessary for performing image processing steps. In particular, CAD processing unit 102 includes elements such as a central control unit 105, a memory 108, a processor 110, and I/O unit 112. Additionally, processor 110 may comprise parallel processing units. It is to be appreciated that in addition to the clustered microcalcification detection algorithms disclosed herein, processing unit 102 is capable of performing a multiplicity of other image processing algorithms such as mass detection, and spiculated mass detection algorithms, either serially or in parallel with the disclosed microcalcification detection techniques.

Viewing station 104 is for conveniently viewing both the x-ray mammogram 101 and the output of the CAD processing unit 102 on a display device 118. The display device 118 may be, for example, a CRT screen. The display device 118 typically shows a highlighted digital mammogram corresponding to the x-ray mammogram 101, the highlighted digital mammogram having information directing the attention of the radiologist to special areas which may contain clustered microcalcifications as determined by image processing steps performed by the CAD processing unit 102.

Viewing station 104 also may comprise a backlighting station 120 for viewing the actual x-ray mammogram 101 itself. The radiologist is assisted by the CAD system 100 by viewing the display device 118, which then directs the attention of the radiologist to the spiculated portions of the actual x-ray mammogram 101 itself. It is to be appreciated that the CAD processing unit 102 is capable of performing other image processing algorithms on the digital mammogram in addition to or in parallel with the algorithm for detecting microcalcifications in accordance with the present invention. In this manner, the radiologist may be informed of several suspicious areas of the mammogram at once by viewing the display device 118, microcalcifications being one special type of suspicious area.

After x-ray mammogram 101 has been developed, it is inserted into the CAD system 100, which will ideally be located near the x-ray development area of a mammography clinic. After being digitized by digitizer 103, the x-ray mammogram will be transported using means, not shown, to the viewing station 104 for viewing by the radiologist along with the output of the display device 118 as described above. After the x-ray mammogram 101 has passed through the CAD system 100, it will be taken away and will undergo the same processing currently practiced in clinics. It is to be noted that memory 108 of CAD processing unit 102 may be used in conjunction with I/O unit 112 to generate a permanent record of the highlighted digital mammogram described above, and/or may also be used to allow non-real-time viewing of the highlighted digital mammogram.

Figure 3:
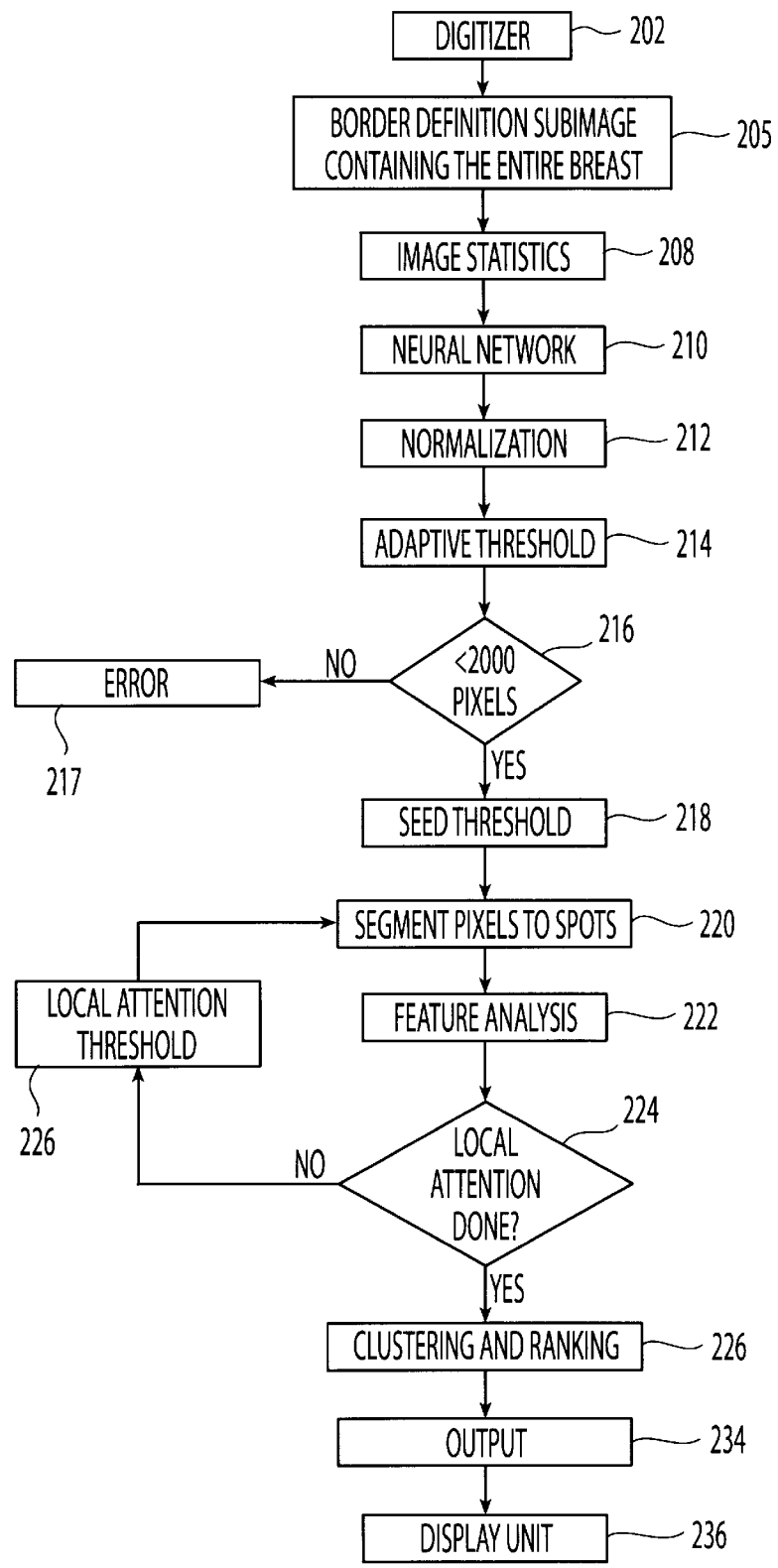
FIG. 3 is a flowchart representing overall steps practiced by the CAD system, according to the preferred embodiment of the intention.

FIG. 3 shows the general steps performed by CAD processing unit 102 on the x-ray mammogram. At step 202, the x-ray mammogram is scanned in and digitized into a digital mammogram by digitizer 103. The digital mammogram may be, for example, a 4000×5000 array of 12-bit gray-scale pixel values, with the intensity and brightness of each pixel being defined by the 12-bit gray scale value. Such a digital mammogram would generally correspond to a typical 8"×10" x-ray mammogram which has been digitized at a 50 micron spatial resolution. If full resolution image such as the 4000×5000 image described above is not necessary for the effectiveness of a particular application, the image may be locally averaged, using steps known in the art, down to a smaller size corresponding, for example, to a 200 micron spatial resolution. At such a resolution, a typical image would then be an M×N array of 12-bit gray scale pixel values, with M being near 1000, for example, and N being near 1200, for example. According to the preferred embodiment, however, the 50 micron full resolution image is used.

At step 206 a border definition algorithm is employed to identify and eliminate features commonly contained in the border regions of the mammogram such as characters or other markings. Additionally at step 206, an algorithm creates a sub-image which contains the entire breast image. Preferably the algorithm detects the boundaries of the breast and selects the smallest portion of the original image which contains the entire breast image. According to the preferred embodiment, the border definition and sub-image creation typically eliminates about one-third of the original 20 Million pixels.

At step 208 statistics of the image data are taken. The average pixel intensity value is determined, and a histogram is created for the frequency of the intensity values.

At step 210, according to the preferred embodiment, the digital mammogram data is applied to a Shift Invariant Neural Network. Preferably, the Shift Invariant Neural Network will generate an output value for each pixel, which is based on the intensity value of the pixel relative to nearby pixels. Without limiting the scope of the invention, the output of the Neural Network is referred to herein as the "contrast value", even though it in general is not purely based on the contrast between the pixel and its neighbors. Ideally, the function that determines the contrast value is designed to select local maxima on a scale of less than 1 mm, and takes into account both the relative intensity of each pixel and the distance from other pixels having similar intensity. Examples of suitable shift-invariant neural networks include those described in "An improved shift-invariant artificial neural network for computerized detection of clustered microcalcifications in digital mammograms" by Zhang et al., Medical Physics, Vol. 23, No. 4, April 1996, pp. 595–601; "Computerized detection of clustered microcalcifications in digital mammograms using a shift-invariant artificial neural network" by Zhang et al., Medical Physics, Vol. 21, April 1994, pp. 517–524; and in U.S. Pat. No. 5,491,627 to Zhang et al. According to the preferred embodiment, the contrast value for each pixel is stored as a 12-bit binary number. As an alternative to using a Neural Network, a high-pass filtering algorithm could be designed to yield contrast values based on the intensity and proximity of nearby pixels.

Referring again to FIG. 3, step 212 serves to normalize the contrast value for each pixel so as to compensate for non-linearities in the x-ray film characteristics and processing techniques.

At step 214, an adaptive threshold is applied to the contrast value for each pixel in order to select a relatively large number of "suspicious" pixels based on their contrast values. The purpose of the adaptive threshold is to greatly reduce the number of pixels to be analyzed by some or all subsequent image processing steps. This reduction occurs by selecting a small fraction of pixels which are the most suspicious pixels. According to the preferred embodiment, the adaptive threshold is simply a numerical threshold applied to the contrast value of each pixel. Such a threshold should be determined experimentally, by selecting a value that does not result in an excessive number of missed tumors, but still effectively reduces the number of pixels to be typically analyzed. Another consideration in choosing the adaptive threshold level is the lowest threshold that will be used in the subsequent steps which will use the result of the adaptive threshold. According to the preferred embodiment, an adaptive threshold of 175 is used. Note that 175 is the same value as the segmentation threshold in step 220 which will be discussed below. Additionally, 175 was found to be effective in reducing the number of pixels to analyzed from about 13 million to typically about 1000.

At step 216 a check is preformed to determine if too many pixels were selected by the adaptive threshold in step 214. An extremely large number of pixels selected, for example over 20,000, would indicate a potential error in either the digitization step 202 or the subimage creation and border identification in step 206.

At step 218 a seed threshold is applied to the contrast values for each pixel to select "seed" pixels. The seed pixels will be used to identify stronger "spots" or groups of contiguous pixels. The seed threshold is typically a simple numerical value and is applied uniformly to all the contrast values of all the pixels that have passed the adaptive threshold. The seed threshold should be designed to be relatively selective, typically selecting only about 0.01%, or about 500, of the pixels. In practice the seed threshold should be chosen experimentally. For example, different thresholds could be applied to test case mammograms to determine whether the background is excluded while still detecting most of the suspicious calcifications. In the preferred embodiment, using the neural network output of step 210, a threshold value of 250 is used.

Figure 4:
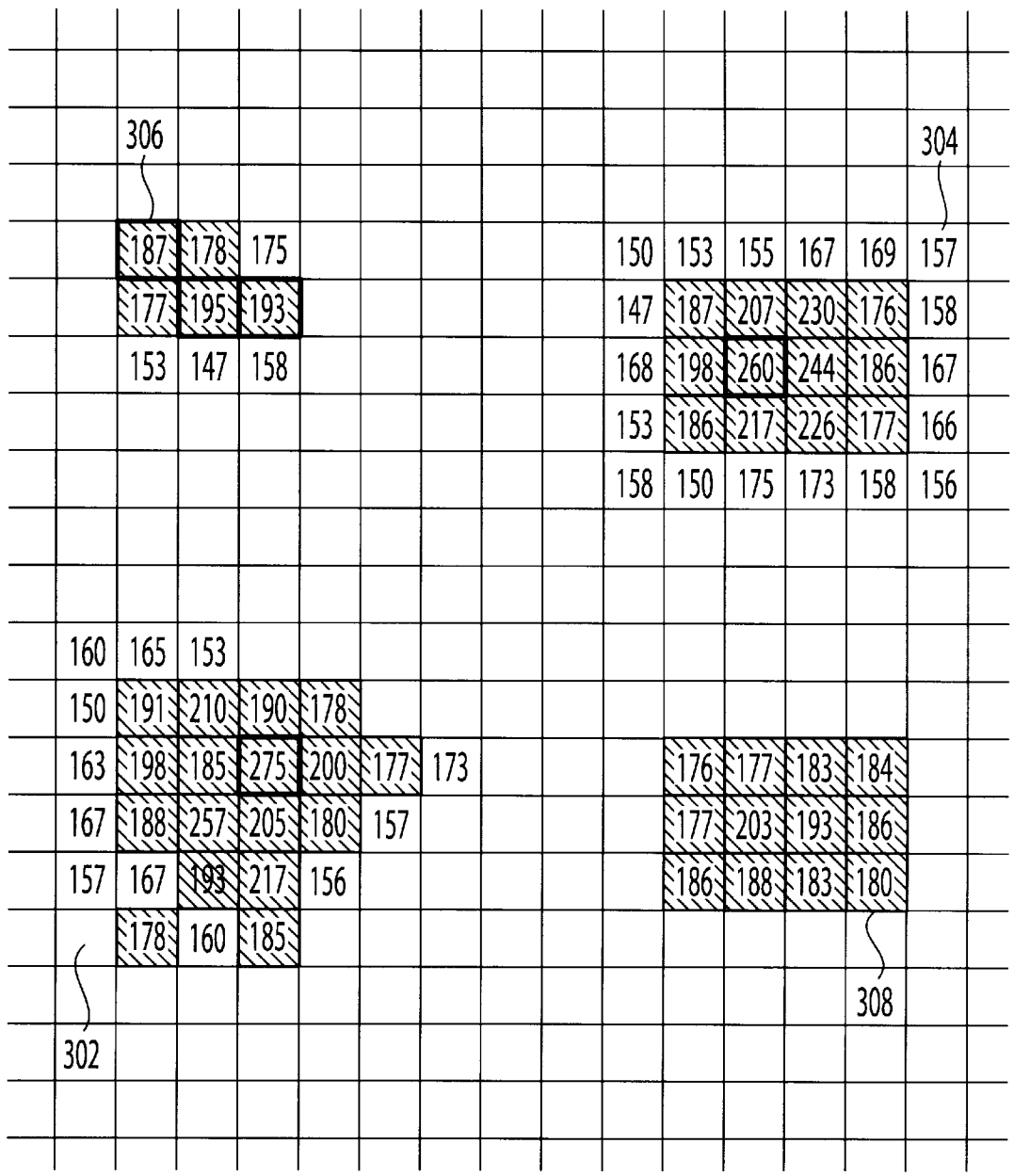
FIG. 4 illustrates an example of the operation of a seed threshold, segmentation threshold for spots, and a local attention threshold, according to the preferred embodiment of the invention.

Referring now to FIG. 4, an illustrative example of the seed threshold step 218 will be described. Assuming the seed threshold is set at 250, the threshold step will identify all pixels having a contrast value greater than 250. In FIG. 4, these are the pixels having contrast values of 275 and 257 in spot 302, and the pixel having contrast value 260 in spot 304.

Referring again to FIG. 3, at step 220 spots are segmented by identifying contiguous groups of pixels containing one or more seed pixels. To perform the segmentation, a lower threshold is applied to each of the eight pixels which are horizontally, vertically, or diagonally adjacent to the seed pixel. The segmentation threshold should also be selected experimentally, and a value of 175 (or 70% of the seed threshold) was found to be appropriate in the preferred embodiment. Any adjacent pixel with a contrast value of greater than 175 is added to the spot. Using a recursive process, pixels adjacent to any pixel in the spot are added to the spot, and the procedure is carried out for each seed pixel identified in step 218. Thus, after step 220 a number of spots are identified, each consisting of a group of contiguous pixels and each containing at least one seed pixel selected in step 218. Spot sizes can range from a single pixel to about 2000 pixels, but are typically are about 5–30 pixels in size, when using a resolution of 50 microns per pixel.

Referring again to FIG. 4, an illustrative example of segmentation step 220 will be described. Beginning with the seed pixels identified in step 218, the spot threshold of 175 is applied to each adjacent pixel. In spot 304, all eight pixels adjacent to the seed pixel have values greater than 175 and are therefore all added to the spot. Additionally, three more contiguous pixels on the right side of spot 304 have contrast values exceeding 175, and are therefore also added to spot 304. A similar procedure is carried out for spot 302.

Referring again to FIG. 3, at step 222 various algorithms may be applied which identify various features which are indicative of false-positive spots. For example, some algorithms analyze the shape of the spots. Such algorithms may identify as false-positive spots which are in the shape of a thin line, or have many pixels positioned on a line. Another algorithm could identify spots which represent dust particles or other "pinhole" artifacts. Such spots can be identified by their small size and relatively high intensity. Another algorithm could identify spots which are too large to represent a malignant tumor. For example, spots with over 1000 pixels at 50 micron resolution are not likely to be malignant tumors. Any spot identified by these feature analysis algorithms is removed from the list of spots.

At step 224 a check is performed to determine if the local attention procedure is complete. In the initial pass through of the process, the local attention procedure has not yet been performed, and thus the process control passes to the local attention step 226.

Figure 5:
FIG. 5 illustrates an example of a local attention threshold, according to the preferred embodiment of the invention.

At step 226 the local attention threshold is applied to the pixels in close proximity to spots, in order to identify further seed pixels and spots. According to the preferred embodiment, the local attention threshold varies as a function of the distance from the nearest existing spot, and takes the form of: LAT=ST+(K * Dist), where LAT represents the local attention threshold, ST represents the threshold used for segmenting the seeds to spots in Step 220, K is a constant, and Dist represents the distance to the nearest existing spot. FIG. 5 illustrates a preferred local attention threshold, which can be described by the following formula: LAT=175+(0.75 * Dist), if Dist<50, where 50 is the maximum distance, in pixels, from a spot where the local attention threshold will be applied. According to FIG. 5, the threshold for pixels which are adjacent to an existing spot is 175, while the threshold for pixels which are 50 pixels away from the nearest spot is 212.5. Beyond a distance of 50 pixels, no additional seed pixels are selected. According to the preferred embodiment, the maximum distance of 50 pixels is chosen because microcalcifications which are found less than 2.5 mm (i.e., 50 pixels at 50 micron resolution) apart in clusters typically are good indicators of malignant tumors. However, other maximum distances may be chosen depending on the application. For detecting malignant tumors in mammograms, the maximum distance is preferably in the range of 2 to 3 mm, however a range of 1 to 5 mm may be practical in some applications. The offset value of 175 was chosen as the segmentation threshold of step 220, but in general could be greater than this value depending on the particular application. The constant value of 0.75 was experimentally determined, and would also vary depending on the particular application.

Figure 6:
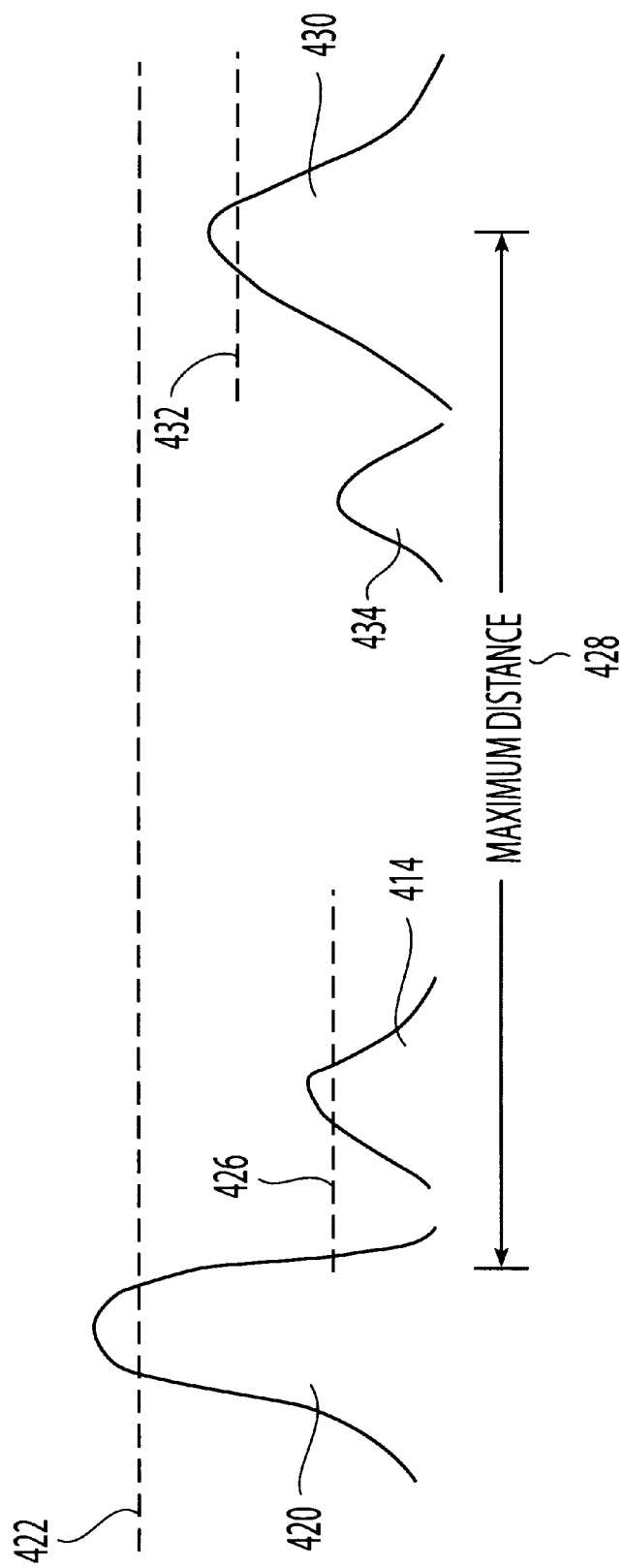
FIG. 6 illustrates an example of using local attention in detecting spots having certain contrast value profiles, according to the preferred embodiment of the invention.

FIG. 6, illustrates an example of the preferred embodiment in detecting spots having certain contrast value profiles. In this example seed threshold 422 would detect spot 420 since some pixels are above the seed threshold. Spot 420 would then be identified by segmentation step 220. Without local attention, subtle spots 424 and 430 would not be detected since they are below the seed threshold 422. In the example of FIG. 6, the local attention threshold depends upon the distance from the nearest pixel in spot 422.

Threshold value 426 is for spots very close to the existing spots, and threshold value 432 is for spots at the maximum distance 428 from the nearest pixel in spot 422. Threshold values 426 and 432 are preferably chosen so as to detect subtle spots within a given maximum distance and also to detect very subtle spots, such as spot 424 which are very close to a known spot. According to the preferred embodiment, the threshold values 426 and 432 where chosen to be 70% and 85% of the seed threshold 422 respectively. Note that some very subtle spots, such as spot 434, which are close to the maximum distance 428 from spot 420 will not be detected.

Since the local attention step preferably selects new seed pixels based in part on their close proximity to already-identified spots, it is preferable that such a local attention step be preceded by a feature analysis and extraction step as in step 222. The algorithm will operate more effectively if new seeds are not identified which are in close proximity to spots which will be eliminated as false positives.

According to the preferred embodiment, the segmentation step 220 is then performed again, this time on the seed pixels newly identified in step 226. In the preferred embodiment, the same recursive spot-building function is used with a threshold value of 175. However, it is to be appreciated that other threshold values and other algorithms could be used. Thus, upon completion of step 220 on the second pass, spots have been identified using the new seed pixels which were identified in local attention step 226.

Referring again to FIG. 4, the local attention threshold step 226 and segmentation step 220 will be illustrated by example. In FIG. 4 two spots, 306 and 308, are shown that under conventional techniques would not have been detected. In the case of spot 306, the seed pixels having a values of 187, 195 and 193 are detected in step 226 as being above the local attention threshold. Note that the distance from nearest pixel of spot 302 is about 6 pixels, and therefore, the local attention threshold, according to the preferred embodiment, would be about 179.5. In the case of spot 308, the seed pixels having contrast values of 183, 184, 203, 193, 186, 188 and 183 are detected by the local attention threshold in step 226. In the segmentation step 220, the contiguous pixels having values greater than the segmentation threshold of 175 are added to the spots, as shown by the shaded pixels in spots 306 and 308.

Referring again to FIG. 3, according to the preferred embodiment, feature analysis step 222 is then preformed again to remove additional false positive spots.

According to the preferred embodiment, after this second pass of steps 220 and 222 are performed, the local attention is considered "done" and control passes to subsequent steps. It will be appreciated, however, that additional iterations of local attention may be employed, with different threshold functions to identify even further seed pixels and spots.

At step 228 the spots are segmented into clusters, further feature analysis is performed, and the clusters are then ranked. Spots are grouped into clusters preferably based upon both the distance between a spot and its closest neighboring spot, and the average contrast value of the pixels in the two spots. Clustering is important in detecting malignant tumors since, in general, tightly spaced clusters are better indicators of malignancy than loosely spaced ones. After the spots are grouped into clusters, further feature analysis is preferably performed to aid the CAD system in ranking the clusters in terms of likelihood of indicating malignant tumors. For example, features that may be significant in ranking the clusters include: the number of spots in the cluster, whether the spots are positioned in a line, and the contrast values of the spots in the cluster.

Once the clusters are ranked, the CAD system, in step 234, outputs the list of clusters with their relative rankings to the display unit, which, in step 236, selects and displays high ranking clusters.

While preferred embodiments of the invention have been described, these descriptions are merely illustrative and are not intended to limit the present invention. For example, although the embodiments of the invention described above were in the context of a system for computer aided diagnosis and detection of breast carcinoma in x-ray films, those skilled in the art will recognize that the disclosed methods and structures are readily adaptable for broader applications. For example, the invention is applicable to many other types of CAD systems for detection of other types of medical abnormalities.

We claim:

1. A method for detecting clustered abnormalities in a digitized medical image comprising the steps of:

receiving digital image data, said image data representing a medical image and comprising a plurality of pixels, each pixel having a gray-scale value based at least in part on the brightness of the pixel;

obtaining an output value for at least some of the pixels, the output value of a pixel being based at least in part on the contrast of the gray-scale value of the pixel relative to the gray-scale values of nearby pixels;

identifying a first set of seed pixels by applying a first threshold function to the output values of at least some of the pixels;

identifying a first set of groups of pixels by applying a second threshold function to the output values of a plurality of pixels in close proximity to at least one pixel of the first set of seed pixels;

identifying a second set of seed pixels by applying a third threshold function to the output values of a plurality of pixels within a predetermined distance to at least some pixels of the first set of groups, said third threshold function being less selective than the first threshold function;

identifying a second set of groups of pixels by applying a fourth threshold function to the output values of a plurality of pixels in close proximity to at least one pixel of the second set of seed pixels; and identifying potential abnormalities in the medical image according to at least the distance between at least some of the groups in the first and second sets of groups of pixels.

2. The method of claim 1 wherein the third threshold function is less selective for pixels which are closer to the nearest group of pixels in the first set of groups than for pixels which are further from the nearest group of pixels in the first set of groups.

3. The method of claim 2 wherein the medical image is an x-ray mammogram and the clustered abnormalities are clustered microcalcifications.

4. The method of claim 3 wherein the predetermined distance corresponds to a distance between about 1 and 5 millimeters on the x-ray mammogram.

5. The method of claim 4 wherein the predetermined distance corresponds to a distance between about 2 and 3 millimeters on the x-ray mammogram.

6. The method of claim 5 wherein the predetermined distance corresponds to a distance of about 2.5 millimeters on the x-ray mammogram.

7. The method of claim 1 wherein the first and second threshold functions are fixed constants.

8. The method of claim 7 wherein the second and fourth threshold functions are of equivalent selectivity.

9. The method of claim 8 wherein each group of pixels in the first and second sets of groups of pixels consists of groups of two or more pixels in which each pixel is horizontally, vertically or diagonally adjacent with at least one other pixel in the group.

10. The method of claim 1 wherein the output value is obtained by inputting the gray-scale values for a plurality of pixels into a feed-forward shift-invariant neural network.

11. The method of claim 1 further comprising the steps of:
analyzing features of each of the groups of pixels in the first set of groups to identify groups which are not likely to indicate abnormalities in the medical image; and
removing from the first set of groups the groups identified as not likely to indicate abnormalities, said steps of analyzing and removing being performed prior to the step of identifying a second set of seed pixels.

12. The method of claim 1 further comprising the step of applying a fixed threshold to the output values of a plurality of pixels to select a sub-image set of pixels, the sub-image set of pixels being a small fraction of the total number of pixels in the digitized medical image, wherein the step of identifying the first set of seed pixels comprises applying the first threshold function to the output value of each pixel in the sub-image set of pixels.

13. A method for detecting clustered abnormalities in a digitized medical image comprising the steps of:
receiving digital image data, said image data representing a medical image and comprising a plurality of pixels, each pixel having a gray-scale value based at least in part on the brightness of the pixel;
obtaining an output value for at least some of the pixels, the output value of a pixel being obtained by inputting the gray-scale values for a plurality of pixels into a feed-forward shift-invariant neural network, the output value being in part based on the contrast of the gray-scale value of the pixel relative to the gray-scale value of nearby pixels;
applying a fixed threshold to the output values of a plurality of pixels to select a set of candidate pixels;
identifying a first set of seed pixels by applying a first threshold function to the output values of each of the candidate pixels;
identifying a first set of groups of pixels by applying a second threshold function to a plurality of pixels in close proximity to at least one pixel of the first set of seed pixels;
analyzing features of each of the groups of pixels in the first set of groups to identify groups which are not likely to indicate malignant tumors in the medical image;
removing from the first set of groups the groups identified as not likely to indicate malignant tumors;
identifying a second set of seed pixels by applying a third threshold function to the output values of pixels in the set of candidate pixels that are within a predetermined distance to at least one group of the first set of groups, said third threshold function being less selective than the first threshold function, and being less selective for pixels which are closer to the nearest group of pixels in the first set of groups than for pixels which are further from the nearest group of pixels in the first set of groups;
identifying a second set of groups of pixels by applying the second threshold function to the output values of each of a plurality of pixels in close proximity to at least one pixel of the second set of seed pixels; and
identifying potential abnormalities in the medical image according to at least the distance between at least some of the groups in the first and second set of groups of pixels.

14. A system for detecting clustered abnormalities in digitized medical images, said system comprising:
a source of digitized image data, said image data representing a medical image and comprising a plurality of pixels, each pixel having a gray-scale value based at least in part on the brightness of the pixel;
an image processor adapted to produce an output value for at least some of the pixels, the output value of a pixel being based at least in part on the contrast of the gray-scale value of the pixel relative to the gray-scale value of nearby pixels;
a first selector adapted to select a first set of seed pixels by applying a first threshold function to the output values of at least some of the pixels;
a first segmenter adapted to select a first set of groups of pixels by applying a second threshold function to the output values of a plurality of pixels in close proximity to at least one pixel of the first set of seed pixels;
a second selector adapted to select a second set of seed pixels by applying a third threshold function to the output values of a plurality of pixels within a predetermined distance to at least some pixels of the first set of groups, said third threshold function being less selective than the first threshold function;
a second segmenter adapted to select a second set of groups of pixels by applying a fourth threshold function to the output values of a plurality of pixels in close proximity to at least one pixel of the second set of seed pixels; and
an indicator for indicating potential abnormalities in the medical image according at least the distance between at least some of the groups in the first and second set of groups of pixels.

15. The system of claim 14 wherein the third threshold function is less selective for pixels which are closer to the nearest group of pixels in the first set of groups than for pixels which are further from the nearest group of pixels in the first set of groups.

16. The system of claim 14 wherein the medical image is an x-ray mammogram, the clustered abnormalities are clustered microcalcifications, and the predetermined distance corresponds to a distance between about 2 and 3 millimeters on the x-ray mammogram.

17. The system of claim 14 wherein the first, second and fourth threshold functions are fixed constants, the second and fourth threshold functions are of equivalent selectivity, and each group of pixels in the first and second sets of groups of pixels consists of groups of two or more pixels in which each pixel is horizontally, vertically or diagonally adjacent with at least one other pixel in the group.

18. The system of claim 14 wherein the output value is obtained by inputting the gray-scale values for a plurality of pixels into a feed-forward shift-invariant neural network.

19. The system of claim 18 further comprising:
a sub-image selector adapted to apply a fixed threshold to the output values of a plurality of pixels to select a sub-image set of pixels, the sub-image set of pixels being a small fraction of the total number of pixels in the digitized medical image, wherein first selector applies the first threshold function to the output value of each pixel in the sub-image set of pixels; and a deselector adapted to analyze features of each of the groups of pixels in the first set of groups to identify groups which are not likely to indicate abnormalities in the medical image, and remove from the first set of groups the groups identified as not likely to indicate abnormalities.

20. A computer-readable medium which can be used for directing an apparatus to detect clustered microcalcifications in an image comprising:

means for receiving digital image data, said image data representing a medical image and comprising a plurality of pixels, each pixel having a gray-scale value based at least in part on the brightness of the pixel;

means for obtaining an output value for at least some of the pixels, the output value of a pixel being based at least in part on the contrast of the gray-scale value of the pixel relative to the gray-scale values of nearby pixels;

means for identifying a first set of seed pixels by applying a first threshold function to the output values of at least some of the pixels;

means for identifying a first set of groups of pixels by applying a second threshold function to the output values of a plurality of pixels in close proximity to at least one pixel of the first set of seed pixels;

means for identifying a second set of seed pixels by applying a third threshold function to the output values of a plurality of pixels within a predetermined distance to at least some pixels of the first set of groups, said third threshold function being less selective than the first threshold function;

means for identifying a second set of groups of pixels by applying a fourth threshold function to the output values of a plurality of pixels in close proximity to at least one pixel of the second set of seed pixels; and means for identifying potential abnormalities in the medical image according to at least the distance between at least some of the groups in the first and second sets of groups of pixels.

21. The computer-readable medium of claim 20 wherein the first, second and fourth threshold functions are fixed constants, the second and fourth threshold functions are of equivalent selectivity, and the third threshold function is less selective for pixels which are closer to the nearest group of pixels in the first set of groups than for pixels which are further from the nearest group of pixels in the first set of groups.

22. The computer-readable medium of claim 21 wherein the output value is obtained by inputting the gray-scale values for a plurality of pixels into a feed-forward shift-invariant neural network, the medical image is an x-ray mammogram and the clustered abnormalities are clustered microcalcifications, and the predetermined distance corresponds to a distance between about 1 and 5 millimeters on the x-ray mammogram.

23. The computer-readable medium of claim 22 wherein each group of pixels in the first and second sets of groups of pixels consists of groups of two or more pixels in which each pixel is horizontally, vertically or diagonally adjacent with at least one other pixel in the group.

24. The computer-readable medium of claim 23 further comprising:

means for analyzing features of each of the groups of pixels in the first set of groups to identify groups which are not likely to indicate abnormalities in the medical image; and means for removing from the first set of groups the groups identified as not likely to indicate abnormalities.

25. The computer-readable medium of claim 24 further comprising means for applying a fixed threshold to the output values of a plurality of pixels to select a sub-image set of pixels, the sub-image set of pixels being a small fraction of the total number of pixels in the digitized medical image, wherein the means for identifying the first set of seed pixels comprises means for applying the first threshold function to the output value of each pixel in the sub-image set of pixels.

* * * * *